United States Patent
Ogino

(10) Patent No.: US 6,842,478 B1
(45) Date of Patent: Jan. 11, 2005

(54) RADIO COMMUNICATION DEVICE AND METHOD CAPABLE OF REDUCING POWER CONSUMPTION BY CONTROLLING AN A/D CONVERTER

(75) Inventor: Tooru Ogino, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/536,187

(22) Filed: Mar. 24, 2000

(30) Foreign Application Priority Data

Mar. 26, 1999 (JP) ............................................ 11/083407

(51) Int. Cl.[7] ............................ H04B 1/69; H04L 23/00
(52) U.S. Cl. ..................................... 375/147; 375/377
(58) Field of Search ................................ 375/316, 377, 375/130–153; 455/343.1–343.5; 348/333.1; 370/335, 342, 441; 341/126, 155

(56) References Cited

U.S. PATENT DOCUMENTS

| | | | | |
|---|---|---|---|---|
| 3,991,304 A | * | 11/1976 | Hillsman | ..................... 600/538 |
| 4,910,752 A | | 3/1990 | Yester, Jr. et al. | |
| 5,260,705 A | * | 11/1993 | Inukai | ........................ 341/155 |
| 5,263,486 A | * | 11/1993 | Jeffreys | ...................... 600/508 |
| 6,133,871 A | * | 10/2000 | Krasner | ................. 342/357.06 |
| 6,144,649 A | * | 11/2000 | Storm et al. | ................. 370/335 |
| 6,496,729 B2 | * | 12/2002 | Thompson | ..................... 607/2 |

FOREIGN PATENT DOCUMENTS

| | | |
|---|---|---|
| EP | 0 504 805 A2 | 9/1992 |
| EP | 0 673 175 A2 | 9/1995 |
| EP | 1-039-648 A2 * | 9/2000 |
| JP | 9-261167 | 10/1997 |
| JP | 9-261172 | 10/1997 |
| JP | 10-93475 | 4/1998 |
| JP | 10-178385 | 6/1998 |
| JP | 10-209943 | 8/1998 |
| JP | 10-313264 | 11/1998 |
| JP | 11-17644 | 1/1999 |
| JP | 2000-13228 | 1/2000 |

OTHER PUBLICATIONS

Franco Maloberti, et al., "Design Consideration on Low–Voltage Low–Power Data Converters", IEEE Transactions on Circuits and Systems I: Fundamental Theory and Applications, IEEE Inc., N.Y., U.S., vol. 42, No. 11, Nov. 1, 1995, pp. 853–863.

* cited by examiner

Primary Examiner—Tesfaldet Bocure
(74) Attorney, Agent, or Firm—Scully, Scott, Murphy & Presser

(57) ABSTRACT

In a radio communication device of a CDMA system selectively operable in high and low power modes to receive a reception analog signal and to produce a demodulated signal, an A/D converter is controlled to reduce power consumption in the low power mode in comparison with the high power mode. The reduction of power consumption can be established by partially operating the A/D converter or by lowering a sample rate in the low power mode. A despreading portion connected to the A/D converter is also controlled in a manner similar to the A/D converter. Each of the high and the low power modes is indicated by a mode control signal produced by a CPU controller.

25 Claims, 4 Drawing Sheets

RADIO COMMUNICATION DEVICE AND METHOD CAPABLE OF REDUCING POWER CONSUMPTION BY CONTROLLING AN A/D CONVERTER

BACKGROUND OF THE INVENTION

This invention relates to a radio communication device, such as a cellular phone, which is used in a code division multiple access (CDMA) system and, in particular, to a method of controlling electric power in the radio communication device so as to reduce electric power consumption in the radio communication device.

Recent attention tends to be focused on a code division multiple access (CDMA) system which enables concurrent communication by the use of the same frequency band among a plurality of stations, such as mobile stations and base stations. This is because the CDMA system is very effective in comparison with the other systems, such as FDMA (Frequency Division Multiple Access) system, TDMA (Time Division Multiple Access) system, in the view of efficiently utilizing a frequency source. In other words, the CDMA system has high frequency utilization efficiency as compared with the FDMA system, the TDMA system.

However, the CDMA system is disadvantageous in that it is larger in power consumption of a receiver than the FDMA and the TDMA systems and, in particular, becomes large in the power consumption in a standby state or mode of the receiver in the CDMA system.

Herein, it is to be noted that proposals have been offered about a wide variety of the CDMA systems each of which adopts individual power saving methods. For example, Japanese Unexamined Patent Publication No. Hei 9-261172, namely, 261172/1997, (will be called Reference 1 hereinafter) has disclosed a CDMA-TDD (Time Division Duplex) system which comprises a plurality of base stations and a plurality of mobile communication devices or terminals. In addition, a mobile communication control station is also included in the CDMA-TDD system to control the base stations. More specifically, a dummy signal is transmitted from each mobile terminal to the base station during non-transmission at a low power level, as compared with a usual transmission power level. In this event, the base station selects a transmission antenna by using the dummy signal received by the base station under control of the mobile communication control station.

Such a mobile communication control station is peculiar to the CDMA-TDD system and is therefore not applicable to the other CDMA systems. This is because a specific station must be prepared in the CDMA-TDD system mentioned in Reference 1.

In Japanese Unexamined Patent Publication, No. Hei 10-209943, namely, 209943/1998 (will be referred to as Reference 2), an intermittent mode in a standby state is divided into a first intermittent mode and a second intermittent mode so as to reduce power consumption in the standby state. More specifically, the first intermittent mode may be a usual intermittent mode of repeating an on state and an off state at a predetermined period while the second intermittent mode serves as a power saving mode which has a period longer than the predetermined period. Accordingly, it is possible with this method to save power in the second intermittent mode in comparison with the first intermittent mode. Thus, the method can save power in the standby state by switching the first and the intermittent modes from one to another.

However, a radio communication device, such as a cellular phone, which is operable in accordance with the above-mentioned method must switch not only the first and the second intermittent modes but also must automatically and frequently execute hand-off operation. Therefore, it is difficult to apply the above-mentioned method to a radio communication device of the CDMA system.

Alternatively, disclosure has been also made in Japanese Unexamined Publication No. Hei 9-261167, namely, 261167/1997 (will be called Reference 3) about a system which has a base station side for transmitting a speech channel for speech and a paging channel which has a narrow band in comparison with the speech channel to call a mobile station or radio terminal. On the other hand, the mobile terminal has a wide-band A/D converter put into an inactive state in a standby state and a narrow-band A/D converter operated in the standby state to receive the paging channel. With this mobile station, the narrow-band A/D converter alone is operated in the standby state with the wide-band A/D converter kept inactive. In other words, electric power may be supplied only to the narrow-band A/D converter and a portion corresponding to the narrow-band A/D converter in the standby state. Accordingly, the power can be saved in the standby state in the mobile station.

However, the mobile station must have the narrow-band A/D converter in addition to the wide-band A/D converter and becomes inevitably complex in structure. Moreover, this system needs to prepare, on a transmission side, not only a spread code for spreading the speech channel but also another spread code for spreading the paging channel. This means that both the base station and the mobile station should be changed in structure. Furthermore, it is to be noted that the method disclosed in Reference 3 can reduce the electric power in the standby state but can not reduce the electric power in the communication state.

SUMMARY OF THE INVENTION

It is an object of this invention to provide a radio communication device, such as a mobile station or terminal, which is capable of reducing electric power not only in a standby state but also in a communication state.

It is another object of this invention to provide a radio communication device of the type described, which is capable of saving power in the radio communication device without changing a control signal, a spread code, and the like and without using any dummy signal.

It is yet another object of this invention to provide a radio communication device of the type described, which can accomplish power saving by considering a sampling rate or the number of bits in an analog-to-digital (A/D) converter.

In a radio communication device which samples a baseband signal into a digital signal by an analog-to-digital (A/D) converter, a principle of this invention is based on the fact that power consumption becomes large with an increase of the sampling rate used in the A/D converter and that a voice or speech signal and a control signal can be sufficiently recognized even by the use of a sampling rate lower than a predetermined sampling rate. This applies to the bit number of the digital signal produced from the A/D converter.

Under the circumstances, the power consumption in the standby state can be reduced by decreasing the sampling rate in the A/D converter or the bit number of the digital signal of the A/D converter in comparison with the communication state. Such a decrease of the sampling rate or the bit number does not bring about failure of recognition of the voice and the control signals.

When low power consumption is required in a state, such as a standby state, a radio communication device according to this invention is operated in a low power mode by decreasing the sampling rate or the bit number of the A/D converter, as compared with a usual mode. Such a low power mode may be selected during the communication state to operate the radio communication device in the communication state. In this event, it is preferable that the sampling rate or the bit number in the low power mode is reduced within a recognizable range of a speech signal even when speech quality is somewhat deteriorated.

For example, the A/D converter may produce a digital signal unit of eight bits in a usual mode and another digital signal unit of four bits in a low power mode. This structure can reduce power consumption in the low power mode. Alternatively, when the base-band signal of 4.096 MHz is subjected to analog-to-digital (A/D) conversion, a sampling rate of 16.384 MHz may be used in the usual mode while a sampling rate of 8.192 MHz may be used in the low power mode.

Now, a method to which this invention is applicable is for use in controlling electric power in a radio communication device which has an analog-to-digital (A/D) converter and which is used in a code division multiple access (CDMA) system. The radio communication device is operable in a selected one of a high power mode and a low power mode. According to an aspect of this invention, the method comprises the steps of detecting each of the high and the low power modes to produce a detection signal representative of either one of the high and the low power modes and operating the A/D converter in the low power mode in response to the detection signal, as compared with the high power mode.

In this event, the operating step may comprise the step of reducing, in the low power mode, a first bit number of a first digital signal to a second bit number of a second digital signal smaller than the first bit number so as to decrease the electric power in the radio communication device.

Alternatively, the operating step may comprise the step of changing the first sample rate to a second sample rate lower than the first sample rate in the low power mode so as to decrease the electric power in the radio communication device.

According to another aspect of this invention, a radio communication device is responsive to a reception analog signal and operable in a selected one of high and low power modes to demodulate the reception analog signal into a demodulated signal. The device comprises an analog-to-digital (A/D) converter for converting the reception analog signal into a digital signal, means for processing the digital signal into the demodulated signal, and a control circuit for controlling the A/D converter so that electric power consumption of the A/D converter is reduced in the low power mode as compared with the high power mode.

According to still another aspect of this invention, a radio communication device is for demodulating a reception analog signal into a demodulated signal and comprises an analog-to-digital (A/D) converter for converting the reception analog signal into a digital signal so that a bit number of the digital signal is variable.

The radio communication device is operable in a high power mode and a low power mode and comprises a controller for supplying the A/D converter with a mode control signal representative of either the high power mode or the low power mode. The A/D converter produces the combination of the first and the second parts of the digital signal when the high power mode is indicated by the mode control signal and, otherwise, producing only the selected one of the first and the second parts of the digital signal. The radio communication device further comprises a sampling signal generator for supplying the A/D converter with a sampling signal of a predetermined frequency which is kept unchanged in the high and the low power modes.

According to yet another aspect of this invention, a radio communication device is operable in response to a reception analog signal to produce a demodulated signal. The radio communication device comprises an A/D converter for converting the reception analog signal into a digital signal and a controllable sampling signal generator for selectively supplying the A/D converter with a first sampling signal of a first sample rate and a second sampling signal of a second sample rate different from the first sample frequency. The A/D converter is operable in response to either one of the first and the second sampling signals and the reception analog signal to produce the digital signal which has the bit number determined by either one of the first and the second sample rates.

DESCRIPTION OF THE PREFERRED EMBODIMENTS

Figure 1:
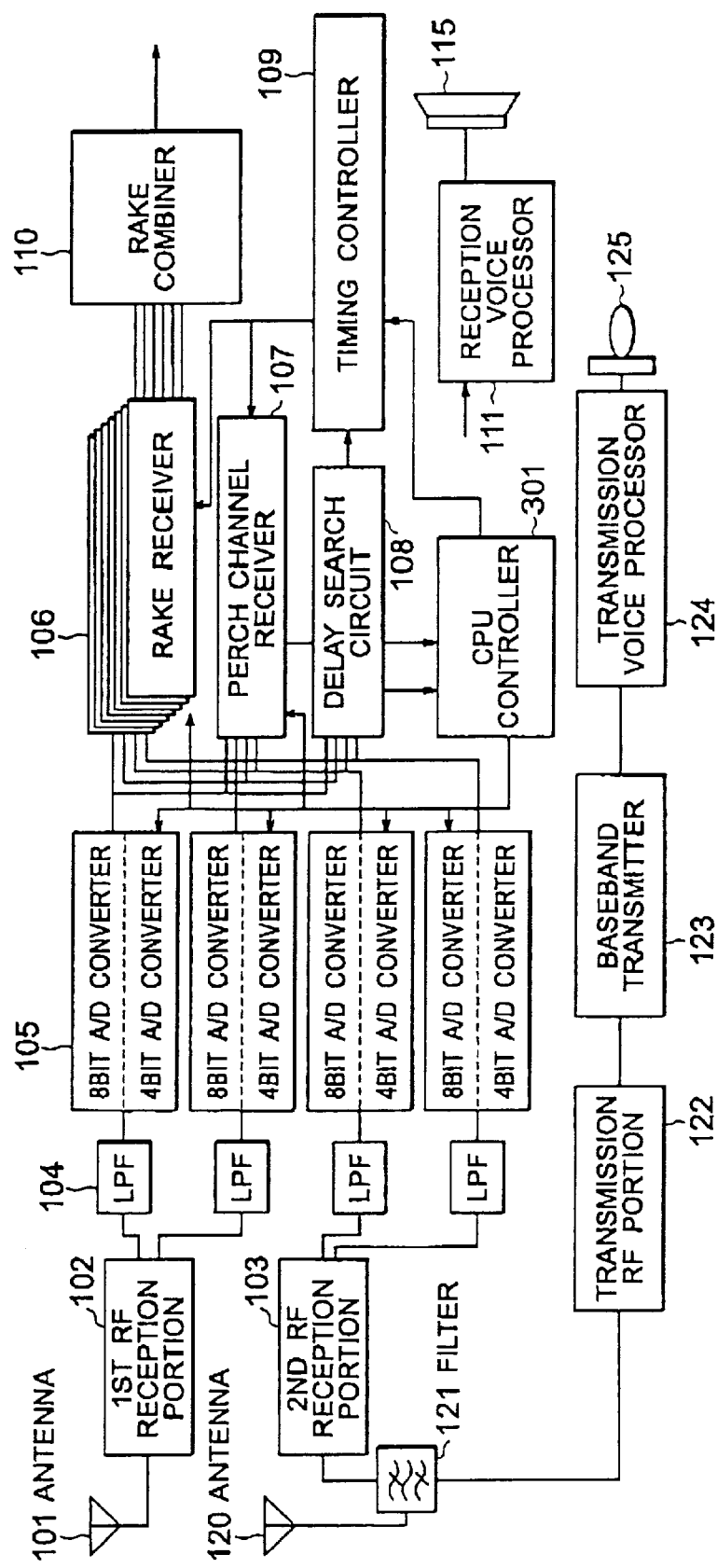
FIG. 1 shows a block diagram of a radio communication device according to a first embodiment of this invention.

Referring to FIG. 1, description will be at first made about a radio communication device according to a first embodiment of this invention. The radio communication device may be a cellular phone, a portable telephone set, a laptop computer, or the like. Herein, it is assumed that the illustrated radio communication device is applicable to a CDMA (Code Division Multiple Access) system and that a forward link and a backward link are defined in the CDMA system in a direction from a base station to the radio communication device and in a reverse direction from the radio communication device to the base station, respectively. In addition, the forward link which is directed from the base station to the radio communication device includes not only a pilot channel, a synchronization channel, and a speech channel but also a perch channel and a paging channel. Each of the channels is given or specified by different spread codes, such as a plurality of Walsh codes.

Herein, it is to be noted that the perch channel is received by each radio communication device at every predetermined time interval after electric power is supplied to the radio communication device. In other words, the radio communication device captures the perch channel on power supply or on powering a electric source aid compares reception levels with one another to determine one of base stations that is nearest to the radio communication device and that may be called a nearest base station.

On the other hand, the paging channel is used to transmit paging information to each radio communication device of reception when a call is received by each radio communication device. The paging channel is assigned a predetermined number of channels and is used to inform each radio communication device from the base station whether or not the reception call arrives at each radio communication device.

In FIG. 1, the radio communication device at first selects the base station by capturing the nearest base station with reference to the perch channel when it is powered. Subsequently, the paging channel is monitored by the radio communication device to detect whether or not the reception call arrives at the radio communication device. Simultaneously, a position of the radio communication device is registered by using the paging channel when the radio communication device is present within a service zone of the base station. As mentioned before, each radio communication device is intermittently informed from the base station through the paging channel about whether or not the reception call arrives.

The other channels and signals than the speech channel and speech signals will be collectively called a control channel and control signals, respectively. Taking this into consideration, it is to be noted that the control signals which are transmitted to each radio communication device through the perch and the paging channels can be represented by symbols which are smaller than those of the speech signals transmitted through the speech channels.

The radio communication device illustrated in FIG. 1 adopts a diversity reception method and therefore has a reception dedicated antenna 101 (will be simply called a reception antenna) and a reception and transmission common antenna 120 (will be simply called a common antenna). The reception antenna 101 and the common antenna 120 are connected to a first RF reception portion 102 and a second RF reception portion 103, respectively.

In the illustrated example, the common antenna 120 is connected through a filter 121 to a transmission RF portion 122. The transmission RF portion 122 is supplied from a microphone 125 with a voice or speech signal which is processed by a transmission voice processor 124 and a base-band transmission portion 123 and which may be referred to as a processed voice signal. The processed voice signal is transmitted in the form of a radio signal to a base station (not shown). More specifically, the voice signal is sent from the microphone 125 to the base-band transmitter 123 through the transmission voice processor 124 and is subjected to spread processing by the base-band transmitter 123. A spread voice signal is converted into a high frequency signal by the transmission RF portion 122 and thereafter transmitted as the radio signal through the filter 121 and the common antenna 120. The following description will not be made about the transmission operation any longer but only about a reception operation because this invention is concerned with the transmission operation.

Herein, consideration will be directed to a reception wave which is received by the radio communication device. As mentioned before, the reception wave includes the control signal and the speech signal which are spread not only by the use of predetermined spread codes, such as Walsh codes, but also by being randomized by the use of pseudorandom noise (PN) codes or the like. The control and the speech signals are also assumed to be subjected to quadrature modulation after they are spread in the above-mentioned manner.

In the illustrated example, diversity reception is carried out by the use of the first and the second RF reception portions 102 and 103 which are supplied with the reception wave subjected to the quadrature modulation. Specifically, each of the first and the second RF reception portions 102 and 103 carries out frequency conversion of the reception wave into a base-band signal which falls within a base-band. In other words, down conversion or frequency demultiplication is executed in each of the first and the second RF reception portions 102 and 103. In addition, the reception wave is separated into an in-phase (I) component and a quadrature (Q) component of the base-band frequency in each of the first and the second RF reception portions 102 and 103. Herein, it is to be noted that the base-band frequency of each of the I and the Q components is as high as 4.096 MHz and that the I and the Q components will be referred to as I and Q base-band signals hereinafter, respectively.

The I and the Q base-band signals are delivered to low pass filters (LPFs) (collectively depicted by 104).

In as much as the reception wave received by the radio communication device in the CDMA system is spread by the base station, as mentioned before, despreading operation must be executed in the radio communication device by the use of the spread codes and the pseudorandom noise (PN) codes used in the base station, to extract a desired reception signal from the reception wave. The despreading operation which is carried out by using the pseudorandom noise (PN) codes can be simply realized by complex multiplication and will not be described any longer.

In FIG. 1, the I and the Q base-band signals are filtered by the low pass filters (LPF) 104 into filtered base-band signals. The filtered base-band signals are converted into digital signals by analog-to-digital (A/D) converters 105 which are operable in a manner to be described later in detail. For the time being, it may be understood that the illustrated A/D converters 105 are operated in response to a mode switch signal SW given from a CPU controller 301.

Among the digital signals, a digital signal which is representative of a state of the perch channel is given to a perch channel receiver 107. As a result, the perch channel receiver 107 detects and selects a nearest one of the base stations by monitoring the state of the perch channel. In this event, it should be understood that the state of the perch channel can be represented by a small number of bits in comparison with the speech signal of the speech channel.

In additions each of the digital signals sent from the A/D converters 105 is supplied to a delay search circuit 107 to calculate a multi-path component and to send a timing controller 109 a peak signal representative of a peak. The digital signals representative of the speech signal are given to a rake finger receiver 106 (which may be simply called a rake receiver). The illustrated rake receiver is structured by six finger receivers.

With this structure, the delay search circuit 108 calculates electric power of the radio wave sequentially sent from the base station or stations with time and obtains electric power at each time instant. The delay search circuit 108 determines maximum electric power and the corresponding time instant which may be referred to as a first time instant. Likewise, the delay search circuit 108 successively determines next one of maximum electric power and the corresponding time instant which may be called a second time instant. Thus, the delay search circuit 108 successively produces the electric power and the time instants as calculation results. Supplied with the calculation results, the timing controller 109 puts a selected one of the finger receivers into an active state at the first time instant and another one of the finger receivers into an active state at the second time instant. Similar operations are successively executed at every time instant indicated by the timing controller 109 so as to successively put each of the six finger receivers into the active state.

As a result, each of the finger receivers in the rake receiver 106 executes the despreading operation at each of the time instants given by the timing controller 109 In the illustrated example, the finger receivers are subjected to timing control by the timing controller 109 connected to the delay search circuit 108 and, consequently, can also despread a delayed reception wave which is delayed due to multi-path fading between the radio communication device and the base station.

At any rate, the rake receiver 106 supplies a rake combiner 110 with finger output signals which are produced from the finger receivers and which are representative of results of despreading operations in the respective finger receivers. The finger output signals are combined together into a combined signal by the rake combiner 110 so that reception electric power is increased. The combined signal is supplied to a reception voice processor 111 to be converted into a reception voice signal through a receiver 115.

Now, it is to be noted that the perch channel receiver 107 is connected to four of the A/D converters 105 which will be referred to as first through fourth A/D converters and which have been simply mentioned before. Each of the A/D converters 105 intermittently monitors the perch channel assigned thereto during the standby state of the radio communication device and selects the nearest base station with reference to the state of the perch channel. Although not shown in FIG. 1, the paging channel is also monitored by a known circuit to detect a reception call for the radio communication device.

As described before, the radio communication device is registered in its position. This shows that a preassigned time for calling is determined on registering the position of the radio communication device and that the radio communication device is informed of the preassigned time. Accordingly, the radio communication device can intermittently put its reception side or section into an active state at the preassigned time under control of the CPU controller 301. Taking the above into consideration, a portion which is located after the A/D converters 105 and which includes the rake receiver 106 may be collectively called a processing portion for convenience of description.

Herein, it is surmised that the first through the fourth A/D converters 105 are structured by conventional A/D converters each of which converts the base-band signal into a digital signal of eight bits and that the base-band signal is sampled at a sampling rate which is equal to four times the base-band frequency in each of the conventional A/D converters.

On this assumption, each of the conventional A/D converters is always operated at a sampling rate which is as high as 4×4.096 MHz (namely, 16.384 MHz). Under the circumstances, the processing portion, such as all of the finger receivers, is also operated at the high sampling rate of 16.384 MHz.

With this conventional structure, the reception section should process the digital signal of eight bits at the sampling rate of 16.384 MHz in response to an assigned call number to the radio communication device even when it is intermittently operated. In addition, the despreading operation and the like must be also processed at every unit of eight bits by using the sampling signal or a clock signal which has a frequency of 16.384 MHz. Using such a high frequency results in large and serious consumption of electric power in the standby state and gives rise to a serious problem on realizing such a radio communication device in the CDMA system.

Taking the above into consideration, each of the illustrated A/D converters 105 is different in structure from the conventional A/D converters mentioned above. Specifically, the A/D converters 105 illustrated in FIG. 1 connected to the LPFs 104 are selectively operable in different modes of eight bits and four bits under control of the CPU controller 301. The A/D converters 105 shown in FIG. 1 selectively produces a first digital signal unit of eight bits in the eight bits mode on one hand and a second digital signal unit of four bits in the four bits mode on the other hand.

With this structure, each of the A/D converters 105 is operated in the eight bits mode when the reception signal must be accurately received. For example, the reception signal should be accurately received during data transmission or on arrival of a reception call in comparison with the standby state. Under the circumstances, the illustrated A/D converters 105 carry out analog-to-digital conversion in the eight bits mode in response to a mode control signal sent from the CPU controller 301 during the data transmission or on arrival of a reception call. In the eight bits mode, the A/D converters 105 are given a clock signal which has a frequency of 16.384 MHz and produce the first digital signal unit of eight bits in parallel. The eight bits mode will be called a usual or a first mode hereinafter.

In the illustrated example, the first digital signal unit of eight bits are delivered to the rake receiver 106 structured by the finger receivers in parallel. Each of the finger receivers is operated in response to a sampling signal which has the same frequency as the clock signal and supplies a result of operation to the rake combiner 110 as a calculation result signal.

While the A/D converters 105 and the rake receiver 106 are operable in the usual or the first mode, power consumption becomes large even in the receiver section of the radio communication device because they are operated at the high frequency of 16.384 MHz.

However, the radio communication device can reduce power consumption in the second or standby mode by decreasing consumption current in the second mode. In the illustrated example, the mode control signal is delivered from the CPU controller 301 to the A/D converters 105 and the rake receiver 106 to put them into the second mode and to thereby reduce electric power in the standby mode. Specifically, the A/D converters 105 and the rake receiver 106 are put into a low power state of processing four bits. In this state, the A/D converters 105 and the rake receiver 106 are given the clock signal of 16.384 MHz like in the first mode.

In other words, the four bits processing is carried out in the A/D converters 105 at the same clock signal frequency as the eight bits processing.

Herein, it is to be noted that each of the A/D converters 105 for the eight bits processing can be divided into a first part of processing four higher significant bits and a second part of processing four lower significant bits.

Under the circumstances, it is readily understood that the four bits processing is carried out by the use of each of the A/D converters 105 which can carry out the eight bits processing. As a result, the second part of processing the four lower significant bits alone becomes active in the low power state with the first part of processing the four higher significant bits kept inactive. This means that only a half part of each A/D converter 105 may be put into an active state and, therefore, the power consumption of each A/D converter 105 can be reduced to a half of the power consumption.

In addition, only a half circuit which is included in the rake receiver 106 located after the A/D converters 105 may be operated in the second mode with the remaining half circuit kept inactive. In consequence, the power consumption in the rake receiver 106 can be reduced to a half of electric power consumed in the first mode.

The above-mention structure can reduce the power consumption in the standby mode and, as a result, can realize a long term standby state in the radio communication device. Moreover, it should be considered that the power consumption in the radio communication device is mainly determined in the standby mode by electric power consumed in the A/D converters 105 and the rake receiver 106. Taking the above into account, power saving in the A/D converters 105 and the rake receiver 106 is very effective.

Figure 2:
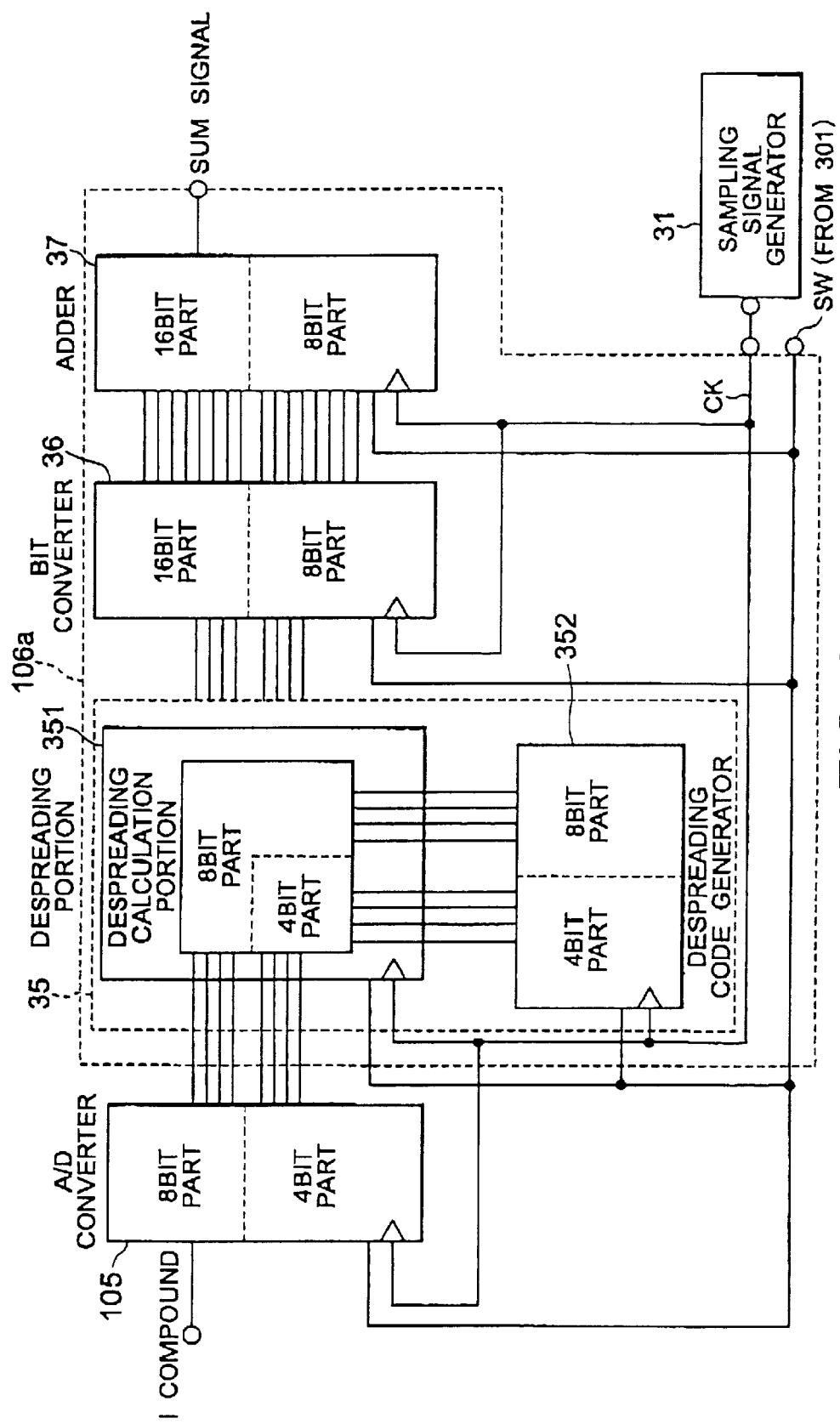
FIG. 2 shows a block diagram of a part of the radio communication device illustrated in FIG. 1 in detail.

Referring to FIG. 2, description will be specifically made about an example of a single one of the A/D converters 105 and a single finger receiver 106a included in the rake receiver 106. In this figure, the single finger receiver 106a alone is shown for brevity of illustration. The illustrated A/D converter 105 and finger receiver 106a are given from the clock generator 31 the clock signal CK which has a frequency of 16.384 MHz. In addition, the A/D converter 105 and finger receiver 106a and are also given from the CPU controller 301 the mode control signal SW which is representative of either one of the first and the second modes to indicate either the eight bits processing or the four bits processing.

Herein, it is assumed that the A/D converter 105 shown in FIG. 2 responds to the in-phase (I) signal from the first RF reception portion 102 (FIG. 1) through the LPF 104 and selectively converts the digital signal unit of eight bits or four bits. Now, if the mode control signal SW designates the eight bits processing, namely, the first mode, the A/D converter 105 produces the digital signal unit of eight bits. On the other hand, if the mode control signal SW designates the four bits processing, namely, the second mode, the A/D converter 105 produces the digital signal unit of four bits. As mentioned in conjunction with FIG. 1, the second part of processing the four lower significant bits in the A/D converter 105 alone becomes active in the second mode while the first part of processing the four higher significant bits is kept inactive. Accordingly, the electric power consumed in the second mode can be reduced to a half of the electric power in the first mode of processing the eight bits. Thus, the A/D converter 105 is operated in the low power state in the second mode of processing the four bits and can be used as the usual mode when the eight bits processing is carried out in the A/D converter 105.

The finger receiver 106a illustrated in FIG. 2 is structured by a despreading portion 35, a bit conversion portion 36, and an adder 37. The despreading portion 35 has a despreading calculation portion 351 and a despreading code generator 352 both of which are given the above-mentioned mode control signal SW and clock signal CK from the CPU controller 301 and the clock generator 31, respectively. When the mode control signal SW is indicative of the first mode or eight bits processing, the despreading code generator 352 produces a first despreading code of eight bits in accordance with the clock signal CK of 16.384 MHz. Otherwise, the despreading code generator 352 produces a second despreading code of four bits in accordance with the clock signal CK of 16.384 MHz.

On the other hand, the despreading calculation portion 351 is supplied with the digital signal unit of eight bits or four bits from the A/D converter 105 and selectively despreads the digital signal unit into a calculation result signal of eight bits or four bits.

When the mode control signal SW is indicative of the eight bits processing or the first mode, the despreading calculation portion 351 and the despreading code generator 352 are operated as a whole and produce the calculation result signal of eight bits. When the mode control signal SW is indicative of the four bits processing or the second mode, only a four lower significant bits part in each of the despreading code generator 352 and the despreading calculation portion 351 is put into an active state while the remaining part in each of the despreading code generator 352 and the despreading calculation portion 351 is put into an inactive state. Accordingly, electric power of the despreading portion consumed in the second mode or the four bits processing is reduced to the half of the electric power consumed in the first mode or the eight bits processing.

The calculation result signal of eight bits or four bits is sent to a bit converter 36 which is shown in FIG. 2 and which is also given the mode control signal SW from the CPU controller 301. In consequence it is readily understood that the illustrated bit converter 36 also can switch the first and the second modes from one to another. More specifically, the illustrated bit converter 36 produces a first output signal of sixteen bits, when the mode control signal SW is indicative of the eight bits processing or the first mode. Alternatively, the bit converter 36 produces a second output signal of eight bits when the mode control signal SW is indicative of the four bits processing or the second mode. The bit converter 36 thus carries out bit conversion of the calculation result signal and serves to process a carry which might occur in an adder 37 placed at the following stage. As readily understood from the above, an eight upper significant bits part of the bit converter 36 is kept inactive when the four bits processing is indicated by the mode control signal SW. The resultant electric power can be reduced in the bit converter 36 also in the second mode.

In the example illustrated in FIG. 2, the A/D converter 105, the despreading portion 35, and the bit converter 36 are operated in response to the clock signal CK which has the frequency equal to the four times the frequency of the base-band signal. This shows that the sampling operation is carried out in both the A/D converter 105 and the finger receiver 106a by the clock signal CK of four times the base-band frequency. Therefore, the adder 37 sums up either the first or the second output signal over four clock signals to produce a sum signal. The sum signal is supplied from the adder 37 to the rake combiner 110 illustrated in FIG. 1.

Specifically, when the mode control signal SW is indicative of the second mode or four bits processing, the adder 37 sums up the second output signal over the four clock signals CK by using only an eight lower bits portion of the adder 37. In this situation, an eight upper bits portion of the adder 37 is not used in the adder 37 during the four bits processing. Thus, power saving or reduction is also accomplished by the adder 37 also in the second mode of processing the four bits.

Referring to FIGS. 1 and 2, description will be made about a whole operation of the radio communication device which includes the A/D converter 105 illustrated in FIG. 2. In this event, a reception wave of a high frequency is given to both of the antennas 101 and 120. In diversity reception, the first and the second RI reception portions 102 and 103 subject the reception wave to down conversion in frequency into the base-band frequency of the base-band signal. In each of the first and the second RF reception portions 102 and 103, the base-band signal is separated into the in-phase (I) component and the quadrature (Q) component which are filtered through the LPFs 104 to the A/D converters 105 mentioned before. Each of the A/D converters 105 selectively converts the in-phase (I) or the quadrature (Q) component into either the digital signal unit of eight bits or the digital signal of four bits.

Herein, the following description will be directed to the operation which is carried out in the standby state or in the second mode and which specifies this invention. In the standby state, the radio communication device executes the four bits processing to monitor the perch channel. As a result, each of the A/D converters 105 supplies the perch channel receiver 106 as the digital signal unit with the digital signal of four bits which are representative of the results of monitoring the perch channel. The digital signal of four bits is processed by the perch channel receiver 106 to determine the nearest one of the base stations. Subsequently, the four A/D converters 105 are individually operated in the second mode of processing the four bits and successively supply the digital signals of four bits to the rake receiver 106, the perch channel receiver 107, and the delay search circuit 108.

In the second mode, each of the A/D converters 105 and each of the six finger receivers 106a of the rake receiver 106 is only partially operated. Therefore, the electric power in the standby state can be reduced to the half of the electric power in the first mode. Each of the calculation result signals obtained by carrying out despreading operation in the six finger receivers (106a) is combined with one another by the rake combiner 110 to be supplied to the reception voice processor 111 as a reception voice signal. The reception voice processor 11 selects a greater one from the reception voice signals and sends it to the microphone 125 to reproduce a voice.

The delay search circuit 108 and the timing controller 109 are operated in the manner mentioned before and will not be described any longer.

Figure 3:
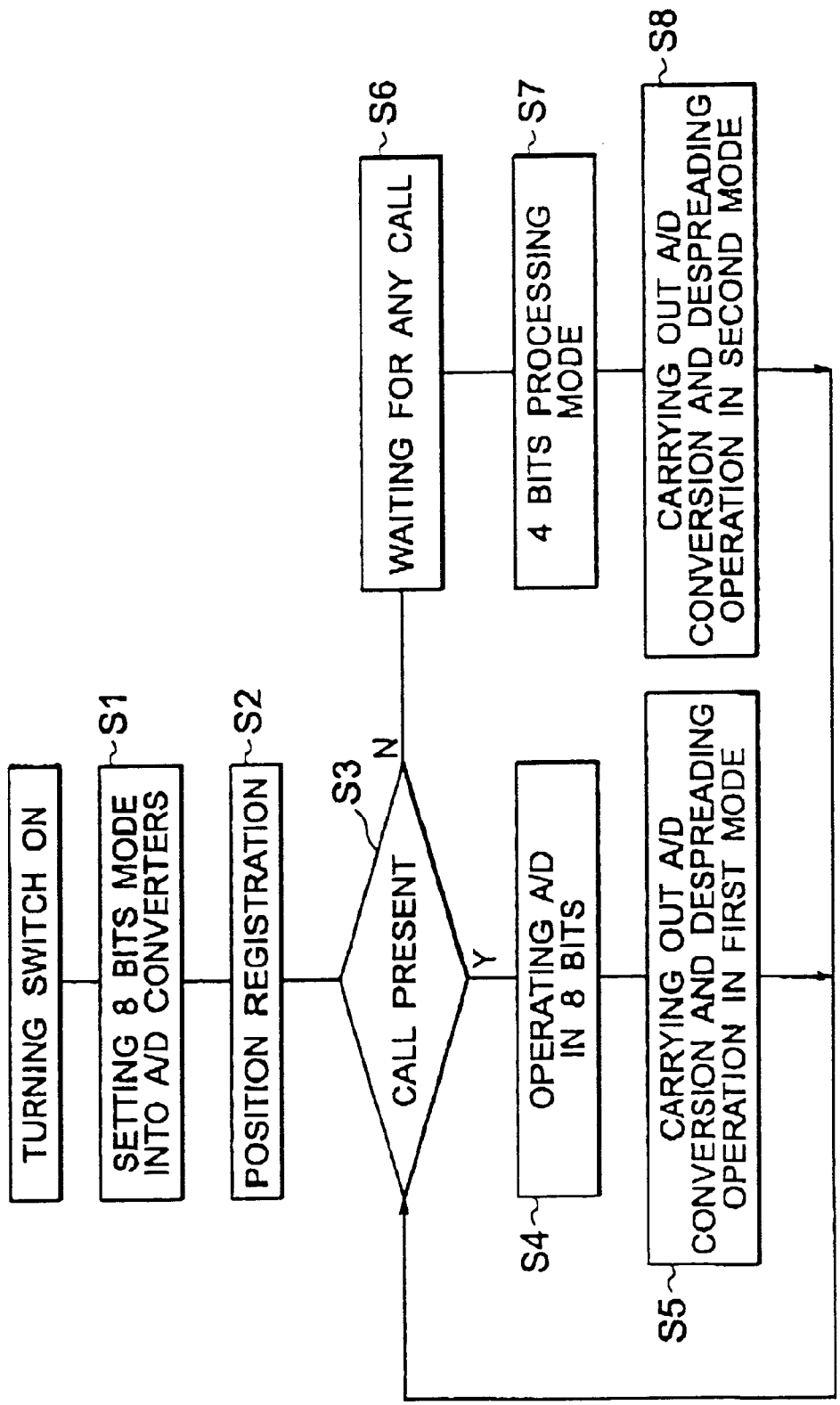
FIG. 3 shows a flow chart for use in describing operation of the radio communication device illustrated in FIGS. 1 and 2.

Referring to FIG. 3 afresh and FIGS. 1 and 2 again, the operation of the A/D converters 105 and the rake receiver 106 will be described more in detail. When the radio communication device is powered by turning a power supply switch on, the CPU controller 301 starts operation of the radio communication device. At first, the position of the radio communication device in question is registered by monitoring the perch channel. In other words, the position registration is started in connection with the radio communication device and must be accurately made by monitoring the perch channel. Taking this into account, the radio communication device is operated in the first mode of processing the eight bits. As a result, the A/D converters 105 are operated in the first mode of processing the eight bits. To this end, the A/D converters 105 are set into the first mode, namely, the eight bits mode at a step S1 in response to the mode control signal SW sent from the CPU controller 301. While the operation is being executed in the first mode, the position registration is executed at a step S2 under control of the CPU controller 301 in a known manner. Thereafter, call processing is carried out at a step S3 by the CPU controller 301 so as to determine whether or not a call is present for the radio communication device. Such a call may be either a reception call (terminating call) or a transmission call (originating call). When the call is present, the step S3 is followed by a step S4 at which the first mode is continuously set in the radio communication device to put the A/D converters 105, the rake receiver 106, and the like into the eight bits processing mode. Thereafter, the A/D converters 105 and the rake receiver 106 carry out analog-to-digital conversion and despreading operation in the eight bits processing mode at a step S5, respectively.

When the step S3 is followed by a step S6 due to absence of any call after completion of the position registration, the A/D converters 105 are put into the second mode of processing the four bits to wait for any call in response to the mode control signal SW sent from the CPU controller 301. The second mode may be also called a four bits processing mode, as shown at a step S7. Thus, the A/D converters 105 and the rake receiver 106 carry out analog-to-digital conversion and despreading operation in the four bits processing mode, as shown at a step S8. During the four bits processing mode, the A/D converters 105 and the rake receiver 106 are partially operated with the reduced electric power, as mentioned in conjunction with FIGS. 1 and 2. For convenience of description, the first and the second modes may be also referred to as high and low power modes, respectively.

Figure 4:
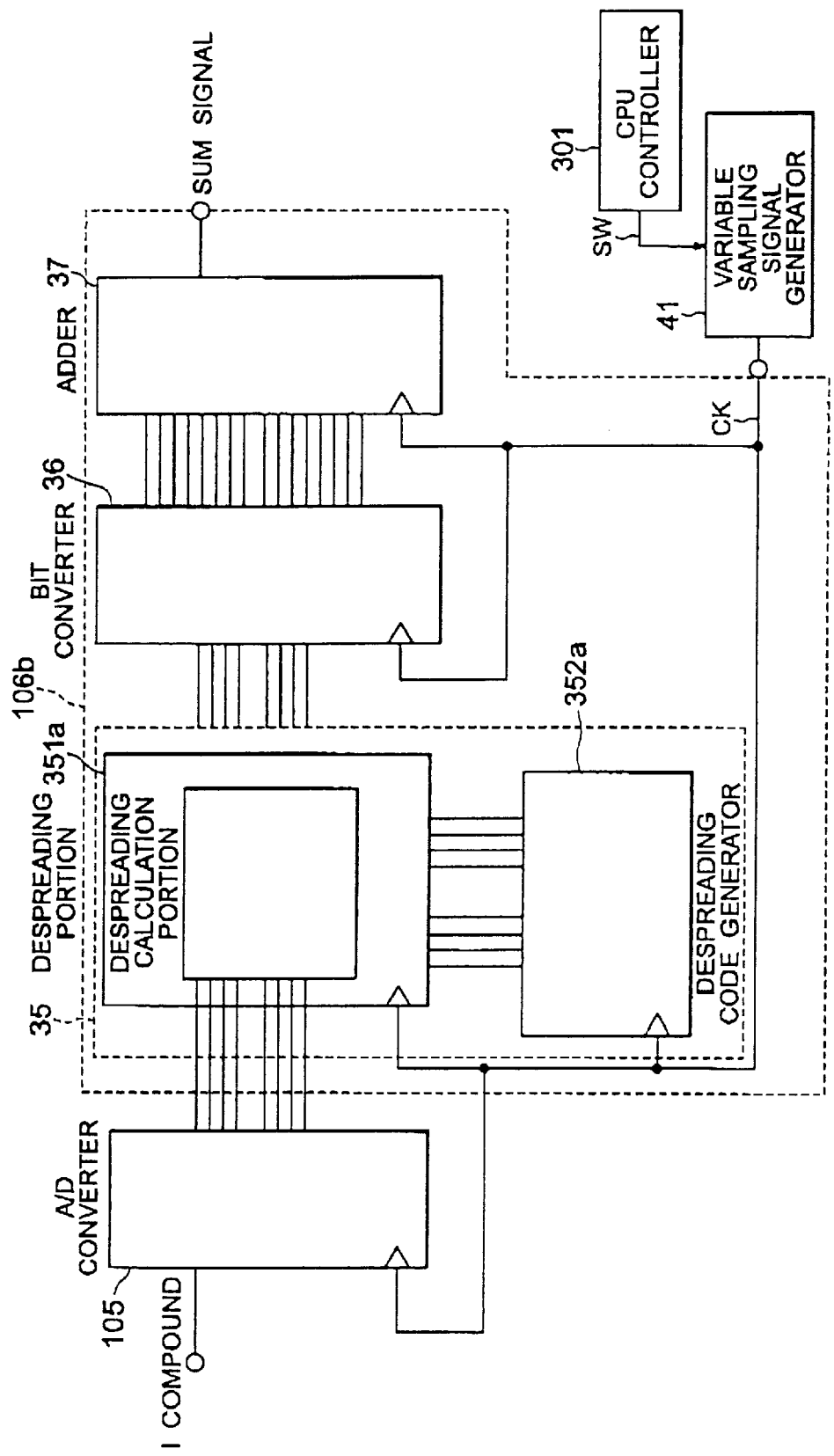
FIG. 4 show a block diagram of a radio communication device according to a second embodiment of this invention.

Referring to FIG. 4, a radio communication device according to a second embodiment of this invention is similar in structure to that illustrated in FIG. 2 except that a mode control signal SW is supplied from the CPU controller 301 to a variable sampling clock generator 41 and is not directly supplied to the A/D converters 105 and the despreading portion 35. Herein, it is to be noted that the variable sampling signal generator 41 can generate first and second sampling signals having first and second sampling rates different from each other. In the example illustrated in FIG. 4, the second sampling rate of the second sampling signal is lower than the first sampling rate of the first sampling signal. In this connection, operation executed by the first sampling rate may be referred to as a high speed sampling mode while operation executed by the second sampling rate, a low sampling mode. It is to be noted here that the high and the low speed sampling modes correspond to the eight and the four bits processing modes illustrated in FIGS. 1 to 3.

Under the circumstances, the CPU controller 301 supplies the variable sampling signal generator 41 with the mode control signal SW which is indicative of either the high speed sampling mode or the low speed sampling mode.

In FIG. 4, it is assumed that the base-band signal which is given to the A/D converters 105 has a frequency of 4.096 MHz and that the first and the second sampling rates are equal to 16.384 MHz and 8.192 MHz, respectively. When the mode control signal SW is indicative of the high and the low speed sampling modes, the variable sampling signal generator 41 generates the first and the second sampling signals at the first and the second sampling rates of 16.384 MHz and 8.192 MHz, respectively.

The first and the second sampling signals are delivered from the variable sampling signal generator 41 to the A/D converters 105, the finger receiver 106b, and the perch channel receiver 107 (FIG. 1).

Like in the first embodiment, the CPU processor 301 indicates the high speed sampling mode by the mode control signal SW to carry out position registration processing, the call processing, and the speech processing at the first sampling rate of 16.384 MHz. In this event, the A/D converters 105 and the finger receiver 106b are supplied with the first sampling signal from the variable sampling signal generator 41 and are operated at the first sampling rate of 16.384 MHz.

Supplied with the first sampling signal, the A/D converters 105 produce the digital signal unit of eight bits in parallel and sent the same to the despreading portion 35 illustrated in FIG. 4. As shown in FIG. 4, the despreading portion 35 includes a despreading calculation portion 351a and a despreading code generator 352a.

Responsive to the first sampling signal, the despreading code generator 352a supplies the despreading calculation portion 351a with a despreading code of eight bits. Supplied with the despreading code of eight bits, the despreading calculation portion 351a successively despreads the digital signal unit by the despreading code of eight bits to produce a first calculation result signal of eight bits. The first calculation result signal of eight bits is converted into sixteen bits and sent to the adder 37. This operation is similar to the eight bits processing mode illustrated in FIG. 2 and will not be described any longer.

In the standby mode, the CPU controller 301 supplies the variable sampling signal generator 41 with the mode control signal SW which indicates the low speed sampling mode which is similar to the four bits processing mode described with reference to FIGS. 1 through 3. In this event, the second sampling signal which has the second sampling rate of 8.192 MHz is delivered from the variable sampling signal generator 41 to both the A/D converters 105 and the rake receiver 106b.

Responsive to the second sampling signal, the A/D converters 105 sample received analog signals at the second sampling rate of the second sampling signal and produce the digital signal units of four bits. Each of the illustrated A/D converters 105 has eight output lines, as shown in FIG. 4. It is surmised that each digital signal unit of four bits appears on every other line of the eight output lines and is sent to the despreading portion 35.

Likewise, the despreading code generator 352a supplies the despreading calculation portion 351a with the despreading code of four bits which are produced through every other line of eight output lines of the despreading code generator 352a. This applies to the despreading calculation portion 351a which produces the calculation result signal of four bits. Specifically, the calculation result signal of four bits appears on every other line of eight output lines of the despreading portion 351a and is converted by the bit converter 36 into a bit converted signal of eight bits. The adder 37 sums up the bit converted signal of eight bits over four sampling periods to supply a sum signal of eight bits to the rake combiner 110 (FIG. 1).

In as much as the operation of the radio communication device illustrated in FIG. 4 is similar to that shown in FIG. 3, description of the operation will be omitted hereinafter.

With this structure, the A/D converters 105 and the rake receiver 106 are operated in the low sampling mode at the second sampling rate which is equal to half of the first sampling rate. Therefore, it is possible to reduce the power consumption of the A/D converters 105 and the rake receiver 106 in the low sampling mode in comparison with the high sampling mode.

While this invention has thus far been described in conjunction with a few embodiments thereof, it will be readily possible for those skilled in the art to put this invention into practice in various other manners. For example, the bit number may be changed from N bits to M bits (where N is greater than M), although the above description has been made only about changing eight bits to four bits in the standby state. In addition, the A/D converters may be changed in bit number during the speech, although the bit number has been changed in the above-mentioned embodiments only on changing the bit numbers of the speech and the standby states from one to another. According to the inventors' experimental studies, it has been confirmed that the speech can be recognized even when the bit number can be reduced to four bits even on receiving the speech signal sampled at ten bits. This shows that the bit rate or the sampling rate may be reduced to two-fifth.

Moreover, the CPU controller 301 illustrated in FIGS. 2 and 4 may be automatically or manually switched between the usual mode and the power saving one. Such automatic switching may be established by monitoring transmission power of the radio communication device and by switching from the usual mode to the low power mode (power saving mode) when the transmission power exceeds a predetermined power level. This structure is helpful to reduce power consumption. The low power mode or power saving mode may be automatically or manually selected in the standby state or in absence of any reception voice signal.

When the usual and the low power modes are manually switched from one to another, predetermined function keys can be prepared in the radio communication device and may be manually operated or selected by a user or a possessor.

As mentioned before, it is possible with this invention to drastically reduce the power consumption in the standby state. Therefore, the radio communication device of the CDMA system according to this invention can realize a very long-term waiting time, in spite of the fact that a receiver according to the CDMA system wastes large power in the standby state due to execution of high speed processing and is unable to realize a long-term waiting state.

What is claimed is:

1. A method of controlling electric power in a radio communication device which has an analog-to-digital (A/D) converter and which is used in a code division multiple access (CDMA) system, the radio communication device being operable in a selected one of a high power mode and a low power mode, the method comprising the steps of:

detecting each of the high and low power modes by monitoring the perching channel to determine if the receiver is in standby mode to produce a detection signal representative of either one of the high and the low power modes; and operating the A/D converter in the low power mode in response to the detection signal, as compared with the high power mode;

wherein the A/D converter is operated in lower power mode when the receiver is in standby mode.

2. A method as claimed in claim 1, the A/D converter converting a reception analog signal into a first digital signal of a first bit number in the high power mode, wherein the step of operating the A/D converter in the low power mode comprises the step of:

reducing, in the low power mode, the first bit number of the first digital signal to a second bit number of a second digital signal smaller than the first bit number so as to decrease the electric power in the radio communication device.

3. A method as claimed in claim 1, the A/D converter converting a reception analog signal into a first digital signal at a first sample rate in the high power mode, wherein the step of operating the A/D converter in the low power mode comprises the step of:

changing the first sample rate to a second sample rate lower than the first sample rate in the low power mode so as to decrease the electric power in the radio communication device.

4. A radio communication device responsive to a reception analog signal and operable in a selected one of high and low power modes to demodulate the reception analog signal into a demodulated signal, the device comprising:

an analog-to-digital (A/D) converter for converting the reception analog signal into a digital signal;

means for processing the digital signal into the demodulated signal; and a control circuit for controlling the A/D converter so that electric power consumption of the A/D converter is reduced in the lower power mode as compared with the high power mode when a receiver is determined to be in standby mode by monitoring a perching and a paging channel for control signals.

5. A radio communication device as claimed in claim 4, the A/D converter producing, as the digital signal, a first digital signal of a first bit number in the high power mode, wherein the A/D converter comprises:

reducing means for reducing the first bit number of the first digital signal to a second bit number of a second digital signal in the low power mode so as to decrease the electric power consumption in the low power mode as compared with the high power mode, and means for selectively producing the first and second digital signals as the digital signal.

6. A radio communication device as claimed in claim 5, wherein the second bit number is equal to half of the first bit number.

7. A radio communication device as claimed in claim 4, wherein the A/D converter converting the reception analog signal into a first digital signal at a first sample rate in the high power mode, wherein the A/D converter comprises:

rate changing means for changing the first sample rate to a second sample rate of a second digital signal lower than the first sample rate in the low power mode so as to decrease the electric power in the radio communication device; and means for selectively producing, as the digital signal, the first and the second digital signals.

8. A radio communication device for demodulating a reception analog signal into a demodulate signal, comprising:

an analog-to-digital (A/D) converter for converting the reception analog signal into a digital signal so that a bit number of the digital signal is variable;

wherein the A/D converter has low and high significant bit parts both of which are operable to produce a first part and a second part of the digital signal, respectively;

the A/D converter selectively producing a selected one of the first and the second parts and a combination of the first and the second parts so as to vary the bit number of the digital signal.

9. A radio communication device as claimed in claim 8, operable in a high power mode and a low power mode and comprising a controller for supplying the A/D converter with a mode control signal representative of either the high power mode or the low power mode;

the A/D converter producing the combination of the first and the second parts of the digital signal when the high power mode is indicated by the mode control signal and, otherwise, producing only the selected one of the first and the second parts of the digital signal.

10. A radio communication device as claimed in claim 9, further comprising a sampling signal generator for supplying the A/D converter with a sampling signal of a predetermined frequency which is kept unchanged in the high and low power modes.

11. A radio communication device as claimed in claim 9, further comprising a rake receiver which is connected to the A/D converter and which is supplied with the digital signal variable in the bit number to carry out a predetermined calculation and to produce an calculation result signal; and demodulating means for demodulating the calculation result signal into the demodulated signal.

12. A radio communication device as claimed in claim 11, wherein the demodulating means comprises:

combining means for combining the calculation result signal into a combined signal; and means for processing the combined signal into the demodulated signal.

13. A radio communication device as claimed in claim 12, wherein each of the finger receivers comprises:

a despreading portion responsive to the digital signal variable in the bit number for carrying out a despreading operation in accordance with the variable bit number of the digital signal, to produce a despreading result signal; and means for calculating the despreading result signal to obtain the calculation result signal.

14. A radio communication device as claimed in claim 13, wherein the despreading portion comprises:

a despreading code generator supplied with the mode control signal from the controller for selectively generating first and second despreading codes corresponding to the bit numbers of the high and the low power modes indicated by the mode control signal, respectively; and a despreading calculation portion supplied with the digital signal variable in the bit number and a selected one of the first and the second despreading codes for carrying out a despreading calculation in accordance with each of the bit numbers and the selected despreading code to produce the despreading result signal varied in bit number determined by each of the bit numbers of the digital signal and the selected despreading code.

15. A radio communication device as claimed in claim 11, wherein the rake receiver is structured by a plurality of finger receivers.

16. A radio communication device operable in response to a reception analog signal to produce a demodulated signal, comprising:

an A/D converter for converting the reception analog signal into a digital signal; and a controllable sampling signal generator for selectively supplying the A/D converter with a first sampling signal of a first sample rate and a second sampling signal of a second sample rate different from the first sample frequency;

the A/D converter being operable in response to either one of the first and the second sampling signals and the reception analog signal to produce the digital signal which has the bit number determined by either one of the first and the second samples rates, wherein the first rate is used when operating in transmission/reception mode and the second sample ratio is used in standby mode and where the standby mode is determined by monitoring the perching and paging channels for control signals instead of speech signals.

17. A radio communication device as claimed in claim 16, wherein the first sample rate is higher than the second sample rate.

18. A radio communication device as claimed in claim 17, further comprising a controller for supplying the sampling signal generator with a mode control signal representative of either a high power mode or a low power mode;

the sampling signal generator delivering, to the A/D converter, either one of the first and the second sampling signals indicated by the mode control signal to make the A/D converter produce the digital signal which has the-bit number determined by either one of the first and the second sample rates.

19. A radio communication device as claimed in claim 18, further comprising a rake receiver operable in response to the mode control signal to carry out calculation of the digital signal in accordance with either one of the first and the second sample rates to produce a calculation result signal.

20. A radio communication device as claimed in claim 19, further comprising demodulating means for demodulating the calculation result signal into the demodulated signal.

21. A radio communication device as claimed in claim 20, wherein the demodulating means comprises:

a combination circuit for combining the calculation result signal into a combined signal; and processing means for processing the calculation result signal into the demodulated signal.

22. A radio communication device as claimed in claim 19, wherein the rake receiver is structured by a plurality of finger receivers.

23. A radio communication device as claimed in claim 22, wherein each of the finger receivers comprises:

a despreading portion responsive to the digital signal variable in the bit number for carrying out a despreading operation of the digital signal in accordance with either one of the first and the second samples rates, to produce a despreading result signal; and means for calculating the despreading result signal to obtain the calculation result signal.

24. A radio communication device as claimed in claim 16, further comprising;

means for manually or automatically varying the bit number of the digital signal produced from the A/D converter.

25. A radio communication device as claimed in claim 24, wherein the reception analog signal is a CDMA signal.

* * * * *